L. A. GEORGE.
SEAL FASTENING.
APPLICATION FILED JAN. 21, 1916.
1,248,310. Patented Nov. 27, 1917.
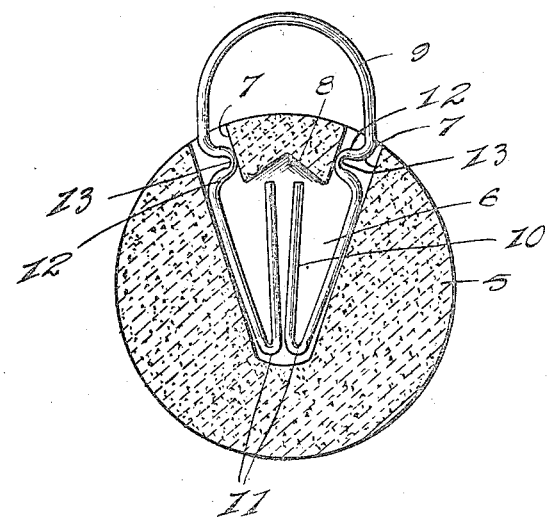
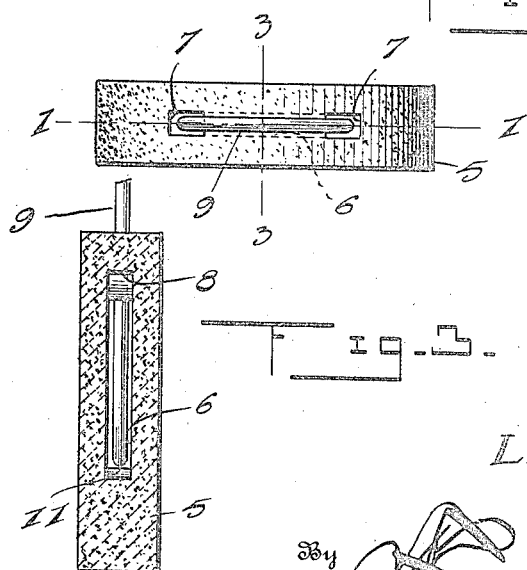
Inventor
L. A. George
Witnesses

UNITED STATES PATENT OFFICE.

LOUIS A. GEORGE, OF NEW YORK, N. Y.

SEAL-FASTENING.

1,248,310.  Specification of Letters Patent.  Patented Nov. 27, 1917.

Application filed January 21, 1916. Serial No. 73,390.

*To all whom it may concern:*

Be it known that I, LOUIS A. GEORGE, a citizen of the United States, residing at Bronx, New York city, in the county of New York and State of New York, have invented certain new and useful Improvements in Seal-Fastenings; and I do hereby declare the following to be a full, clear, and exact description of the invention, such as will enable others skilled in the art to which it appertains to make and use the same.

This invention relates to improvements in seal fastenings and has for its primary object to provide an improved seal fastening including essentially a seal body, and a wire fastening member associated therewith and being so constructed as to prevent the wire fastening member from being removed from the seal body and the latter being used a second time.

With this and other objects in view, the invention consists in the novel construction, combination and arrangement of parts as will be hereinafter specifically described, claimed and illustrated in the accompanying drawing, in which:

Figure 1 represents a sectional view through the seal fastening, taken on the line 1—1 of Fig. 2, Fig. 2 represents a plan view of the seal fastening, Fig. 3 represents a sectional view through the seal body on the line 3—3 of Fig. 2.

Referring to the drawing in detail, wherein similar reference numerals designate corresponding parts throughout the several views, the numeral 5 indicates the seal body, which is constructed of a composition of porcelain and metal filings. The body 5 is preferably of substantially cylindrical formation and is formed with an internal recess or cavity 6, substantially V-shaped and communicating at its relatively large end with a pair of spaced entrances 7. The portion of the end wall of the recess or cavity 6 lying between the entrance openings 7 is cut away to present an inverted V-shaped cavity 8, for a purpose which will hereinafter appear. The fastening wire is bent centrally to define a loop 9, which is formed of malleable metal and the portions of the wire adjacent the loop 9 are tempered and bent to define a pair of substantially V-shaped spring fastening members 10, the free ends of which are directed toward the loop 9 and the opposite ends 11 of which are engaged in the relatively small end of the internal recess or cavity 6. The free ends of the V-shaped members 10 are adapted, subsequently to their insertion in the entrances 7, to spring outwardly and engage the walls of the V-shaped cavity 8, so as to permanently secure the loop 9 to the body 5.

The malleable portions of the fastening wire which lie in the entrance openings 7 are crimped, as indicated at 12, so as to provide guard members practically closing said entrances and prevent tampering with the free ends of the V-shaped securing members 10 and in forming these crimps 12 the wire is materially reduced in thickness, at the prominent portions of the crimps, as indicated at 13, thereby materially decreasing the strength of the wire at these points, and rendering it liable to breakage should an attempt be made to straighten out the crimps in order to gain access to the free ends of the V-shaped spring fastening members 10.

By the introduction of metal filings in the porcelain body, any attempt to dissolve the metallic fastening wire with acids may be readily detected, and the action of the acid on the metal filings lying on the surface of the body will furnish ample evidence that the fastening has been tampered with, even though the fastening wire is replaced by an imitation identical with the original.

What I claim is:

A seal fastening including a body constructed of a composition of porcelain and metal filings and having a substantially V-shaped internal recess or cavity and entrances communicating with the relatively large end of the V-shaped recess, and a metallic fastening wire engaged in the recess.

In testimony whereof I affix my signature in presence of two witnesses.

LOUIS A. GEORGE.

Witnesses:
 FREDERIC ALAN CROSLAND.
 BERNARD JOSEPH DURNING.

Copies of this patent may be obtained for five cents each, by addressing the "Commissioner of Patents, Washington, D. C."